Mar. 27, 1923.

A. N. SPRAGUE.
CIRCULAR HACK SAW.
FILED SEPT. 28, 1921.

1,449,790.

INVENTOR,
Archidell N. Sprague
BY
Harry W. Bowen
ATTORNEY.

Patented Mar. 27, 1923.

1,449,790

UNITED STATES PATENT OFFICE.

ARCHIDELL N. SPRAGUE, OF SPRINGFIELD, MASSACHUSETTS.

CIRCULAR HACK SAW.

Application filed September 28, 1921. Serial No. 503,759.

*To all whom it may concern:*

Be it known that I, ARCHIDELL N. SPRAGUE, a citizen of the United States of America, residing at Springfield, in the county of Hampden, Commonwealth of Massachusetts, have invented certain new and useful Improvements in Circular Hack Saws, of which the following is a specification.

This invention relates to improvements in hack saws and particularly of the type known as circular or band hack saws.

An object of the invention is to provide means for quickly attaching and detaching the saw blade to its holding frame.

A further object is to provide means for accurately guiding the saw during its cutting movements in order that the opening may be accurately formed.

Broadly considered my invention comprises a member preferably disk shaped that is adapted to be rotated by any suitable means, as a bit brace, said member being provided with clamping means for attaching a circular band saw thereto so that it may be removed and another substituted for the same, or of different diameter.

The improvement is particularly adapted for cutting circular openings in partitions where metal lath and nails would form an obstruction. The saw is therefore adapted for cutting both metal and wood.

Referring to the drawings.

Figure 1:
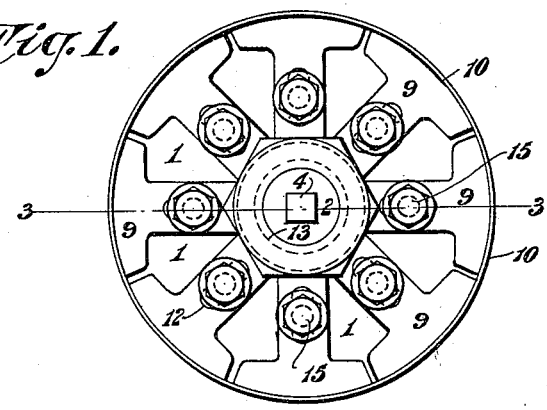
Fig. 1 is a top plan view showing the arc shaped clamping elements for engaging the inner surface of the band saw and a nut for forcing the clamping members radially outward.
Figure 2:
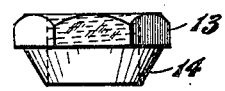
Fig. 2 is a detail side elevational view of the clamping nut.
Figure 3:
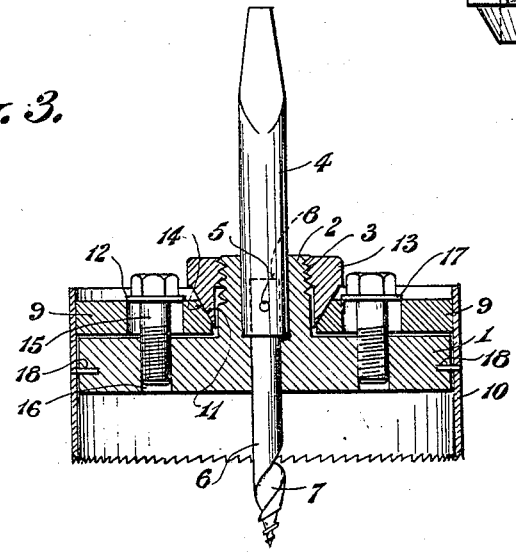
Fig. 3 is a vertical sectional view on the line 3—3 of Fig. 1 showing the disc shaped member in section also the arc shaped clamping members, the nut for forcing the members outward and the threaded screws for holding the clamping members against the disk shaped members.
Figure 4:
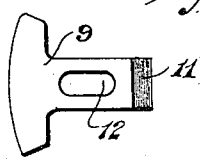
Fig. 4 is a detail plan view of one of the arc shaped clamping members.

Referring to the drawings in detail:

1 designates a disc-shaped member preferably formed of brass or some suitable non-rusting material and having a hub portion 2 that is formed with the threads 3. This hub is bored out to receive the operating shank 4 and is secured to the disc shaped member by any suitable means as a pin indicated at 5. 6 is a drill having the thread 7 at its lower end. This extension may be made to fit into the shank 4 as indicated by the dotted lines 8 and secured thereto by the pin 5. The disc shaped member 1 has mounted or located on its upper surface a plurality of arc shaped saw clamping members 9 which engage the inner surface of the hack saw band 10 whereby when these members are forced radially outward and firmly held or retained in their outward positions they will serve to frictionally attach and retain the saw 10 to the member 1. Each of the arc shaped members 9 are formed with an inclined surface 11 and a slot 12. 13 designates a nut that is formed with an inclined or cone-shaped surface 14 which engages the inclined surfaces 11. By threading the nut 13 downward on the threads 3 the arc shaped members 9 will be forced radially outward against the inner surface of the band saw 10 for retaining these members in their clamping or outward position. Screws 15 pass through the openings 12 and are threaded into the openings 16 of the member 1. 17 designates washers located under the heads of the screws 15 which span the openings 12.

When the device is rotated by applying a brace bit to the shank 4 the threaded end 7 of the drill 6 will act as a leader or axial for the device and cause the saw 10 to cut a true circular opening, since the saw is designed to cut metal, as metal lath, nails and the like, the thread 7 will serve to keep the saw true to its course.

It is obvious that loosening the screws 15 and then turning the nut 13 upward the saw may be removed and another substituted. The diameter of the disk 1 is preferably made slightly smaller than the diameter of the band saw 10 in order that it may be easily slipped on and removed therefrom.

It is obvious that drills or bits of different diameter may be substituted for the one indicated at 6 either a drill for operating on metal or wood as desired. 18 designates pins that are secured to the saw 10 and enter recesses in the disk 1 for the purpose of accurately locating it with relation to the disk.

From this description it will be seen that I have provided a simple and efficient means for clamping a circular hack saw blade to an operating member and one that can be used over and over again without lessening its efficiency.

What I claim is:

1. In a device for the purpose described, the combination with a disc-shaped member, a band saw, means for clamping or attaching the saw thereto, said means including a plurality of members having arc-shaped surfaces adapted to engage the inner surface of the saw, for holding the same, means for forcing the same in a fixed position against the saw, and means for clamping the same in their holding positions.

2. In a device for the purpose described, the combination with a circular band saw, of means for clamping the same to an operating device, said means including a plurality of expansible members adapted to engage the inner surface of the saw for holding the same, means for operating the expansible members including a nut having a cone shaped surface for engaging the expansible saw engaging members.

3. In a device for cutting circular openings, a band hack saw, means for attaching the same to a disc-shaped member comprising a plurality of radially movable members having inclined surfaces and mounted on the disc-shaped member and designed for engaging the inner surface of the saw, means for moving said members comprising a nut having a cone-shaped surface and engaging the inclined surfaces of said members, said nut having a threaded engagement with the disk shape member, and means for rotating the device.

4. A device for cutting circular holes in metal, comprising radially movable members having openings therethrough screws in said openings, a disc-shaped member having threaded openings and into which the screws are threaded, a nut for operating said members for moving the same against the saw, and means for axially guiding the movement of the saw through the material being operated upon.

5. In a device for cutting circular holes, a band saw, a circular disk, said disk having openings to receive pins on the saw for positioning the same, a plurality of members for clamping the saw to the disk, said members having arc-shaped ends for engaging the inner surface of the saw, slots in the members, screws or the like in the slots for clamping said members to the saw holding members, means comprising a nut for expanding the arc-shaped members, a drilling device for guiding the operations of the saw.

6. A circular hack saw having in combination, a disc-shaped member to receive the inner surface of the saw, expansible means for frictionally engaging the inner curved surface of the saw including devices slidable on said member, a nut having threaded engagement with the said disc-shaped member for moving the devices against the saw, and means for axially guiding the saw.

ARCHIDELL N. SPRAGUE.